US006651219B1

(12) United States Patent
Elliott (10) Patent No.: US 6,651,219 B1
(45) Date of Patent: Nov. 18, 2003

(54) SYSTEM AND METHOD FOR GENERATION OF TEXT REPORTS

(75) Inventor: Thomas A. Elliott, San Francisco, CA (US)

(73) Assignee: Multex Systems, Inc., New York, NY (US)

( * ) Notice: Subject to any disclaimer, the term of this patent is extended or adjusted under 35 U.S.C. 154(b) by 0 days.

(21) Appl. No.: 09/228,874

(22) Filed: Jan. 11, 1999

(51) Int. Cl.[7] .............................................. G06F 15/00
(52) U.S. Cl. ........................ 715/530; 715/531; 715/538
(58) Field of Search ................................ 707/530, 538; 715/530, 538, 580.1, 531; 705/1, 7, 8, 9

(56) References Cited

U.S. PATENT DOCUMENTS

| | | | | |
|---|---|---|---|---|
| 4,989,141 A | * | 1/1991 | Lyons et al. ................ | 705/36 |
| 5,101,375 A | | 3/1992 | Goldhor ..................... | 715/531 |
| 5,410,647 A | * | 4/1995 | Peaslee et al. ............. | 345/467 |
| 5,471,575 A | * | 11/1995 | Giansante ................... | 715/513 |
| 5,710,900 A | | 1/1998 | Anand et al. ............... | 345/764 |
| 5,799,325 A | * | 8/1998 | Rivette et al. .............. | 715/500 |
| 5,802,352 A | | 9/1998 | Chow et al. ................ | 707/517 |
| 5,809,266 A | | 9/1998 | Touma et al. ............... | 345/764 |
| 5,818,850 A | * | 10/1998 | Tsai et al. ................... | 714/741 |
| 5,835,916 A | * | 11/1998 | Inaki et al. ................. | 707/509 |
| 5,852,819 A | | 12/1998 | Beller ......................... | 707/1 |
| 5,870,746 A | * | 2/1999 | Knutson et al. ............. | 707/101 |
| 5,999,193 A | * | 12/1999 | Conley et al. .............. | 345/440 |
| 6,047,298 A | * | 4/2000 | Morishita .................... | 715/532 |
| 6,195,653 B1 | * | 2/2001 | Bleizeffer et al. .............. | 707/2 |
| 6,195,665 B1 | * | 2/2001 | Jarett .......................... | 707/500 |

FOREIGN PATENT DOCUMENTS

| | | |
|---|---|---|
| GB | 2302424 A | 1/1999 |
| GB | 2336922 A | 11/1999 |
| JP | 080329107 | 12/1997 |
| JP | 10308768 | 11/1998 |

OTHER PUBLICATIONS

James Shaw, "Segregatory Coordination and Ellipsis in Text Generation" Dept. of Computer Science, 1998, pp. 1–7.*
John Wilkinson, "Aggregation in Natural Language Generation: Another Look" Computer Science Department, 1995, pp. 1–14.*
PC Week, v6, n51, p. 31, Dec. 25, 1989, "Dynamite database tool", D. Lewallen.

* cited by examiner

*Primary Examiner*—Joseph H. Feild
*Assistant Examiner*—Maikhanh Nguyen
(74) *Attorney, Agent, or Firm*—Kenyon & Kenyon (57) ABSTRACT

An automated text generation system may be used to generate financial reports based on financial data. The text generation system uses decisional statements in conjunction with a base equation, and the decisional statements are evaluated using the base equation to determine a resulting logic path. The logic path may then be used to specify appropriate text fragments reflecting analytic conditions. The text fragments may include variables to vary the text content of the report for aesthetic and analytic purposes, which are evaluated at run-time. A variety of analytic conditions may be represented in a flexible manner.

36 Claims, 8 Drawing Sheets

```
MAP.TXT
...
PRICE02
1
cocurprice/coprice12mo,15,50,75,85,95,99,101,105,110,115,125,135,150
225

PRICE03
3
cocurprice/coprice12mo,50,75,85,95,99,101,105,110,115,125,135,150
cocurprice/coprice12mo,curgrprice/grp12moprice,80,90,98,102,110,120
cocurprice/coprice12mo,cursp500price,cursp500price,sp50012moprice,80,90,98,102,110

PRICE04
2
curgrprice,grp12moprice,99,101
cursp500price,sp50012moprice,99,101

PRICE05
5
(cocurprice-coprice12mo)/coprice12mo,1,.9
(curgrprice-grp12moprice)/grp12moprice,1,.9
(cursp500price-sp50012moprice)/sp50012moprice,1,.9
(cocurprice/coprice12mo)/(curgrprice/grp12moprice),1,99,101
(cocurprice/coprice12mo)/(cursp500price/sp50012moprice),1,99,101
```

```
*Beginning PRICE03                                  ~602
evaluating  90.125000                               ~603
evaluating  62.000000

Evaluated equation.
cocurprice, coprice12mo,50,75,85,95,99,101,105
110,115,125,135,150
  is 90.125000 / 62.000000 *100 which equals
145.362903                                          ~604 if  50 < 145.3629 case = A, nope.
if  75 < 145.3629 case = B, nope.
if  85 < 145.3629 case = C, nope.
if  95 < 145.3629 case = D, nope.
if  99 < 145.3629 case = E, nope.
if 101 < 145.3629 case = F, nope.
if 105 < 145.3629 case = G, nope.
if 110 < 145.3629 case = H, nope.
if 115 < 145.3629 case = I, nope.
if 125 < 145.3629 case = J, nope.
if 135 < 145.3629 case = K, nope.
if 150 < 145.3629 case = L, yep.
145.3629 > 150, case = L                            ~605 cocurprice=90.125000
evaluating  90.125000 / 62.000000                   ~608
curgrpprice=60.207199
evaluating  60.207199 / 43.424500                   ~609

Evaluated equation.
cocurprice/coprice12mo,curgrpprice/grp12moprice,
80,90,98,102,110,120
  is 1.453629 / 1.386480 *100 which equals
104.843133                                          ~610 if  80 < 104.8431 case = A, nope.
if  90 < 104.8431 case = B, nope.
if  98 < 104.8431 case = C, nope.
if 102 < 104.8431 case = D, nope.
if 110 < 104.8431 case = E, yep.
104.8431 > 110, case = E                            ~612 cocurprice=90.125000
evaluating  90.125000 / 62.000000                   ~614
cursp500price=1111.770020
evaluating  1111.770020 / 756.619019                ~615

Evaluated equation.
cocurprice/coprice12mo, cursp500price/
sp50012moprice,80,90,98,102,110,120
  is 1.453629 / 1.469392 * 100 which equals
98.927238                                           ~616 if  80 < 98.9272 case = A, nope.
if  90 < 98.9272 case = B, nope.
if  98 < 98.9272 case = C, nope.
if 102 < 98.9272 case = D, yep.
98.9272 > 102, case = D                             ~618 comping>Gname,Name[0]|                              ~620

With this exceptional return, the stock has
provided a performance meeting the return
acheived by the S&P 500 index and a stronger
one than of the Globally Established Software
Companies peer group.
```

SYSTEM AND METHOD FOR GENERATION OF TEXT REPORTS

BACKGROUND INFORMATION

In the financial industry, it is desirable to disseminate financial data (earnings, stock prices, etc.) in a quick and accurate manner. It is also desirable that the format in which this information is disseminated is easy for people working in the financial industry (for example, brokers and analysts), as well as the individual investor, to quickly understand. As a result, such financial information is typically provided in the form of "investment reviews" or similarly titled textual reports. These reports provide textual summaries and analysis of the financial data presented, and may also provide graphical or tabular representations of that data. For example, a report on company ABC may report the current stock price and quarterly earnings, may also report the earnings growth or rate of return over a selected time period (e.g., annually), and may further provide qualitative commentary as to how the company is performing. The person reading the investment review may then draw conclusions from the analysis given by the report, for example, whether to buy, sell or hold company ABC securities.

Because such investment reports are textual in nature, they are typically generated by one or more people who gather the necessary information, perform appropriate calculations and then compose the textual summaries that provide the analysis of financial performance levels. However, using people to generate these reports has many drawbacks. It takes time to generate these reports, even with the aid of electronic publishing and spreadsheet tools. Market reaction to financial data is often instantaneous, and the sooner "raw" financial information can be digested and made available to financial professionals the better. Furthermore, thousands of companies around the world are traded publicly, and therefore the amount of manpower needed to generate financial summaries—which is directly proportionate to the number of companies to be reviewed—is substantial.

Attempts have been made to automate the process of generating such financial reports. For example, Research Data Group, Inc. (of San Francisco, Calif.), has provided investment reports on mutual funds generated via a computer program that calculates various financial benchmarks based on supplied financial data, and provides textual summaries based on these calculations. This text provides the reader with descriptions of the relative performance of the subject fund versus its peer funds and versus a market index such as the S&P 500. It also provides text that identifies investment sectors and the percentage each sector represents of the fund's portfolio, as well as giving the reader a textual interpretation of statistics that quantify the risk in the portfolio relative to the risk being assumed in the portfolios of peer funds.

This program for mutual funds, however, was found to be inadequate for dealing with common real-world situations involving the various types of securities and corporate statistics. The mutual fund program used traditional computational logic methods, which were part of a "hard-coded" decisional structure (implemented using Microsoft Visual Basic). Thus, this program could not be adapted, for example, to varying security types, corporate financial information, or analytical computations. This program also could not be adapted for varying textual responses across different data ranges or different security types.

Furthermore, this program could not adequately deal with complex situations such as transitions from positive to negative quantities (and vice versa), evaluations involving zero quantities, and evaluations involving quantities converging to zero. These situations are not uncommon when evaluating corporate financial data: earnings may be positive or negative (or zero); return on investment may be negative or zero; earnings may transition from positive to negative over the course of a fiscal year (and vice versa); price-to-earnings ratios may experience large changes as earnings expand or contract close to zero; as well as other possible situations.

SUMMARY OF THE INVENTION

An exemplary embodiment according to the present invention is implemented as a text generation system. The exemplary text generation system may include a memory system that contains raw data, text data, and a number of decisional statements which each include at least one operand and and a number of result groupings; as well as a text generator operatively coupled to the memory system to produce a text report using the decisional statements, the raw data and the text data.

The text generation system generates text output by evaluating a base equation using the operand(s) of a decisional statement to obtain an equation result. The text generation system then selects one result grouping out of the number of result groupings of the decisional statement based on the equation result, and determines a logic path based on the selected result grouping. The system further selects a text fragment from the text data based on the logic path, and then generates an output that includes the text fragment.

The text generation system implementation according to the present invention may be beneficially employed to quickly generate textual reports that are easily readable by those interested in interpretations of raw data. For example, financial reports may be created from financial data (e.g., stock prices, earnings figures) in a format that is easily readable by interested investors. The ability of the exemplary text generation system to handle complex analytical cases such as negative-positive transitions of quantities and values approaching or equal to zero allows the text generation system to be employed in a variety of real world situations where flexibility and adaptability are important.

Furthermore, such reports can be generated almost instantaneously—as fast as the text generation system can access the raw data, compute the various equations and select the proper text elements. Accordingly, large numbers of reports can be generated in a short period of time, and reports can be provided on a nearly real-time basis. Further efficiencies may be achieved where certain report types are in a standardized format, such that similar decisional statements and text fragments can be reused with different raw data files to produce multiple reports.

DETAILED DESCRIPTION

According to the present invention, a computer application may be implemented that generates human-readable summary text reports from raw numerical or other data. For example, an embodiment according to the present invention may be used to generate financial summary reports based on raw financial data, such that these financial reports may be provided to financial industry professionals or other interested persons on a current or even real-time basis (such as, for example, by electronic delivery). The present invention may also be used to implement text generation systems for other fields where such text generation is desirable.

According to the present invention, the exemplary embodiment may be provided with flexible data evaluation and text selection features. Data evaluation may be achieved using a common "base equation", and by specifying a series of "decisional statements" which utilize the base equation. The base equation may be evaluated using operands listed in a decisional statement, and a "logic path" may be determined based on the result. The logic path may then be used to select a collection of text fragments corresponding to the logic path. Text may be generated by selection of individual text fragments within the collection of text fragments, according to a "text template" for the collection. The text fragment collections may specify a number of selection options, which may be structured in a manner that allows the composition of natural and grammatically correct text.

Figure 1:
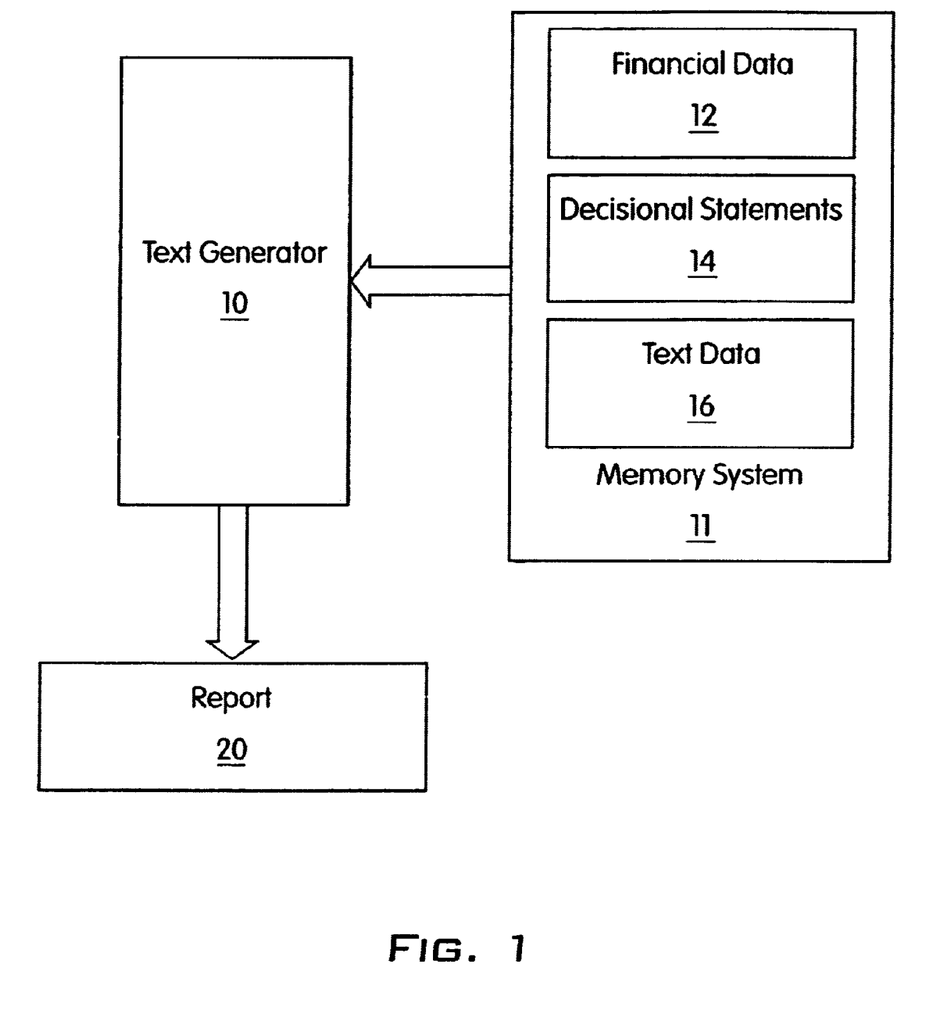
FIG. 1 shows a block diagram of an exemplary embodiment of a text generation system according to the present invention.

FIG. 1 illustrates an overall system architecture of an automated financial text generation system 1 in accordance with an exemplary embodiment of the present invention. A text generator 10 is operatively coupled to a memory system 11, which may include one or more memory devices (RAM, ROM, disk, or other storage format). The text generator 10 may include a computer program with one or more processors (e.g., microprocessors) or other computational elements. Financial data 12 are provided in the memory system 11 in a particular format (e.g., a common spreadsheet format, comma delimited text, or other format) such that the text generator 10 may parse the financial data for the data that are needed for use in generating a summary financial report 20. Financial decisional statements 14 are also provided in the memory system 11 in a particular format (which will be described further below) such that the text generator 10 may determine those calculations that should be performed in generating the report, and the conclusions that should be drawn from those calculations. Text data 16 are also provided in the memory system 11, to provide a library of text fragments that will used to generate the report 20.

The financial summary report 20 generated by text generator 10 may be in a particular format (for example, printed text, ASCII file, hypertext file, etc.) according to the ultimate destination for the report. For example, the exemplary financial text generation system 1 may be operated to produce a financial report 20 for dissemination over the Internet, in which case it may be desirable that the resulting financial report 20 be formatted as a Hypertext Markup Language (HTML) document.

Figure 2:
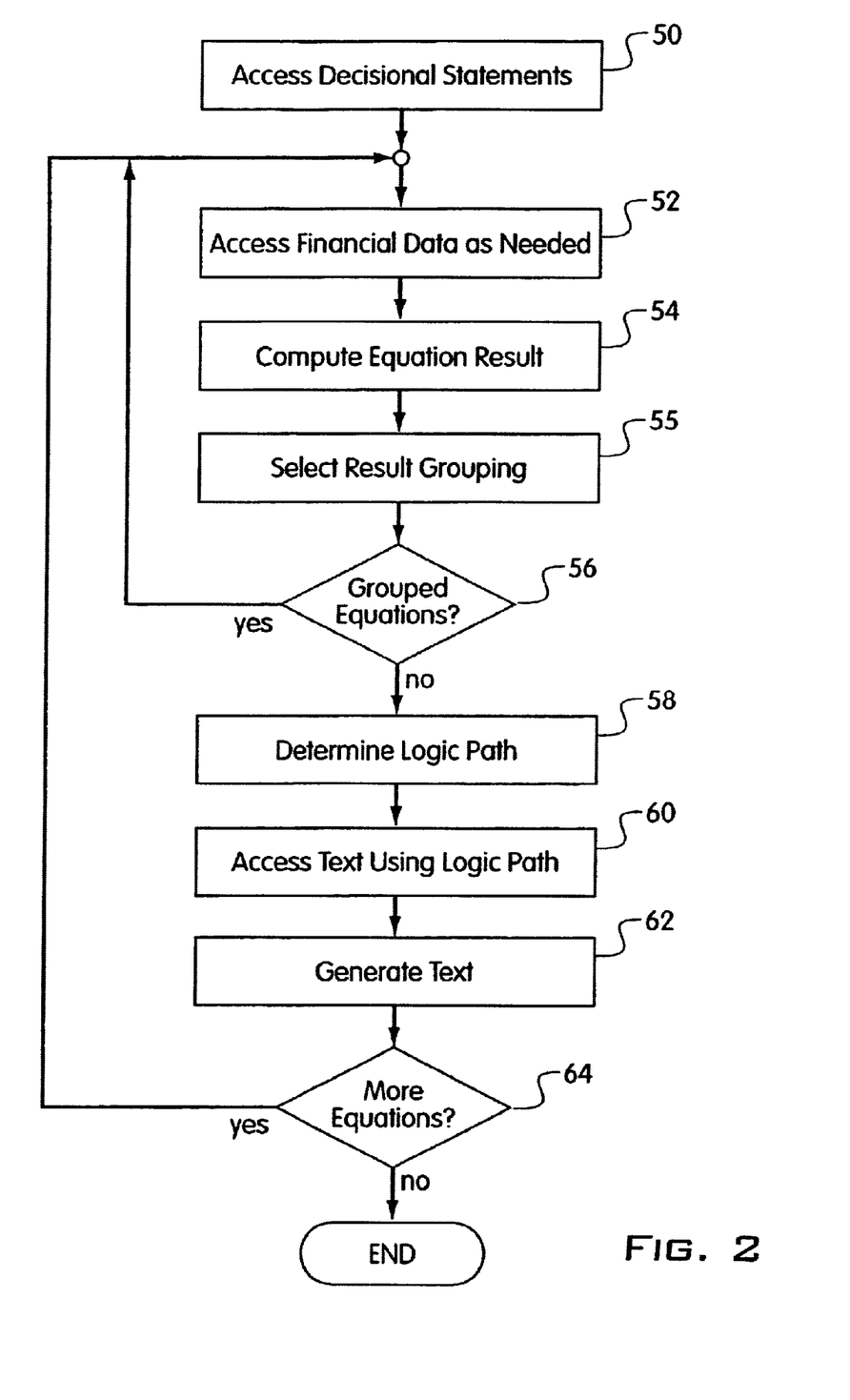
FIG. 2 shows a first flow chart of the operation of the exemplary text generation system of FIG. 1, according to the present invention.

An overview of an exemplary operation of the exemplary financial text generation system 1 is illustrated by the flow chart of FIG. 2. In step 50, the text generator 10 accesses the financial decisional statements 14 in memory system 11. Each financial decisional statement 14 may be comprised of, for example, at least one reference to financial data and a number of "result groupings" as defined by at least one "result group delimiter" listed in the decisional statement 14. The reference(s) to financial data will be used to calculate a result for a pre-defined base equation of the text generation system. The result groupings represent ranges (specified by the result group delimiters) into which the results of the base equation calculation will be segmented, and therefore the result groupings serve as distinct quanta to represent ranges of possible results of the base equation calculation using the financial data.

These decisional statements 14 may be tailored to the type of financial data being analyzed. For example, a decisional statement 14 may be written to evaluate the return over the past year for a particular security. Such a decisional statement 14 might take the form:

curprice,price 12mo, 10,20,30

Where "curprice" represents the current price of the security, "price 12mo" represents the price of the security 12 months ago, and "10," "20," and "30" are result group delimiters defining a number of result groupings for possible results from the calculation of the base equation using the "curprice" and "price 12mo values". The specific components of an exemplary decisional statement for use with the exemplary text generation system 1 will be further described below.

Each of the financial decisional statements 14 are evaluated by: accessing any raw financial values from the financial data 12 needed to resolve the references to financial data in the decisional statement 14 (step 52), computing a result for the base equation using these figures (step 54), and selecting a result grouping based on the equation result (step 55). The result grouping generated through the evaluation of the decisional statement 14 is used to determine a logic path (step 58) for generating appropriate text.

Multiple financial decisional statements 14 may be grouped together, such that a logic path may be produced based on the evaluation of the multiple decisional statements 14 in combination. In such a case, each financial decisional statement 14 in a grouping is evaluated until all the decisional statements 14 of the group have been evaluated (step 56), and then a logic path is specified based, for example, on the result groupings generated by each of the decisional statements 14 of the group (step 58).

Once a logic path has been determined (step 58), the logic path is used to reference a collection of the text data 16 tailored to the analytic condition represented by the logic path (step 60). This collection may include a range of possible phrases appropriate for the analytic condition represented by the logic path, and text may then be selected from the collection to promote a natural textual style (e.g., by random selection). Once the desired text is selected, it is written to an output (step 62) and the process is performed again for the next decisional statement 14 (or group of decisional statements 14), if any (step 64). Once all the decisional statements 14 have been evaluated, the report 20 is complete, and may then be disseminated in a desired fashion (print, e-mail, world wide web site, online service, etc.).

Figure 3:
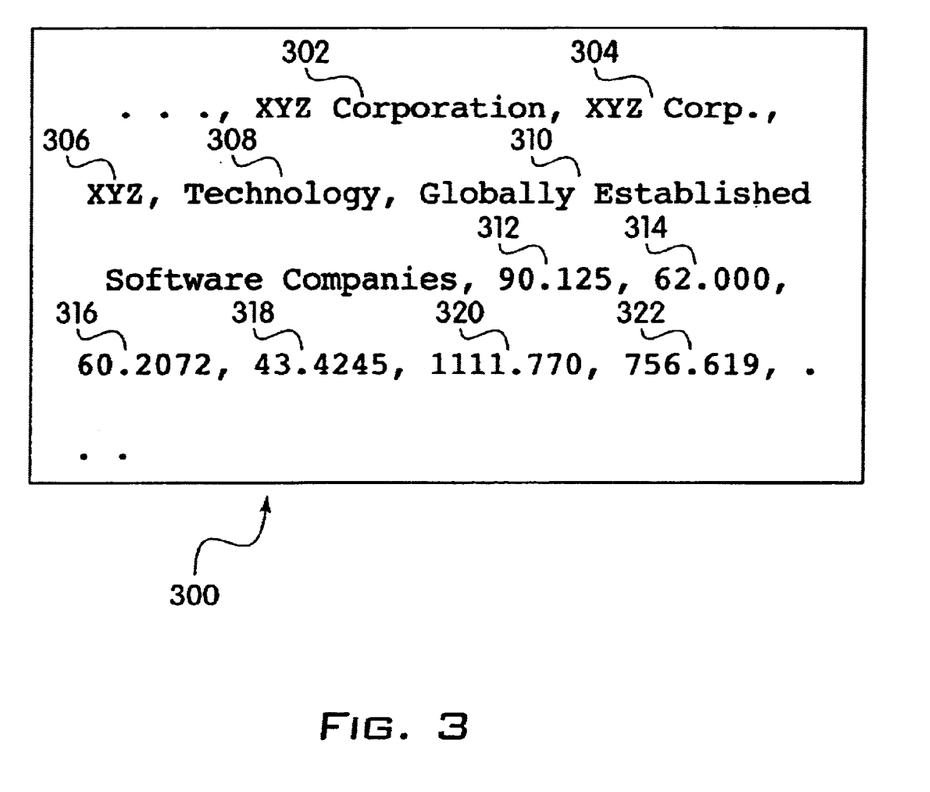
FIG. 3 shows a portion of an exemplary data file for use by the exemplary text generation system of FIG. 1, according to the present invention.

A more detailed description of the exemplary financial report text generation system 1 according to the present invention will now be explained. FIG. 3 depicts an exemplary financial data file 300 containing financial data for a fictitious company XYZ Corp. Individual elements of information—textual and numerical—are provided in financial data file 300 delimited by commas, although other known delineation techniques may be used. The financial data file 300 is formatted in a uniform manner to allow retrieval by the text generator 10 in the course of evaluating financial decisional statements 14. The contents of financial data file 300 may be stored in the memory system 11 (e.g., on a magnetic disk) to allow access by the text generator 10.

The actual contents of the data file 300 may vary according to the type of report desired. FIG. 3 illustrates a portion of the kind of data content that may be found in a financial data file 300 for XYZ Corp. Exemplary data file 300 includes the formal name 302 of the company ("XYZ Corporation"), the colloquial name 304 of the company ("XYZ Corp."), and the company's trading symbol 306 ("XYZ"). Also provided is the name of the industry sector 308 to which this company belongs ("Technology") and the industry group 310 within the sector ("Globally Established Software Companies"). In this case, the data file 300 is arranged such that the text generator 10 may determine the locations of the various data as needed (for example, using a data mapping file, or any other organizational technique as may be well known by those in the art).

The data file 300 further includes typical financial statistics related to XYZ Corp., such as the current stock price 312 ("90.125"), the stock price from 1 year ago 314 ("60.000"), the industry peer group index value 316 ("60.2072"), the industry peer group index value from 1 year ago 318 ("43.4245"), the current S&P 500 Index Value 320 ("1111.770") and the S&P 500 Index Value from 1 year ago 322 ("756.619"). Other values that may also be included are the gross revenue, earnings per share, P/E ratio and Average Qualitative Opinion (AQO) figures for XYZ Corp., as well as any other pertinent financial or corporate information. The content of the data file 300 is dependent on the type of report to be generated and specifically on the data required by the financial decisional statements and text data used to compose the desired report.

Figure 4:
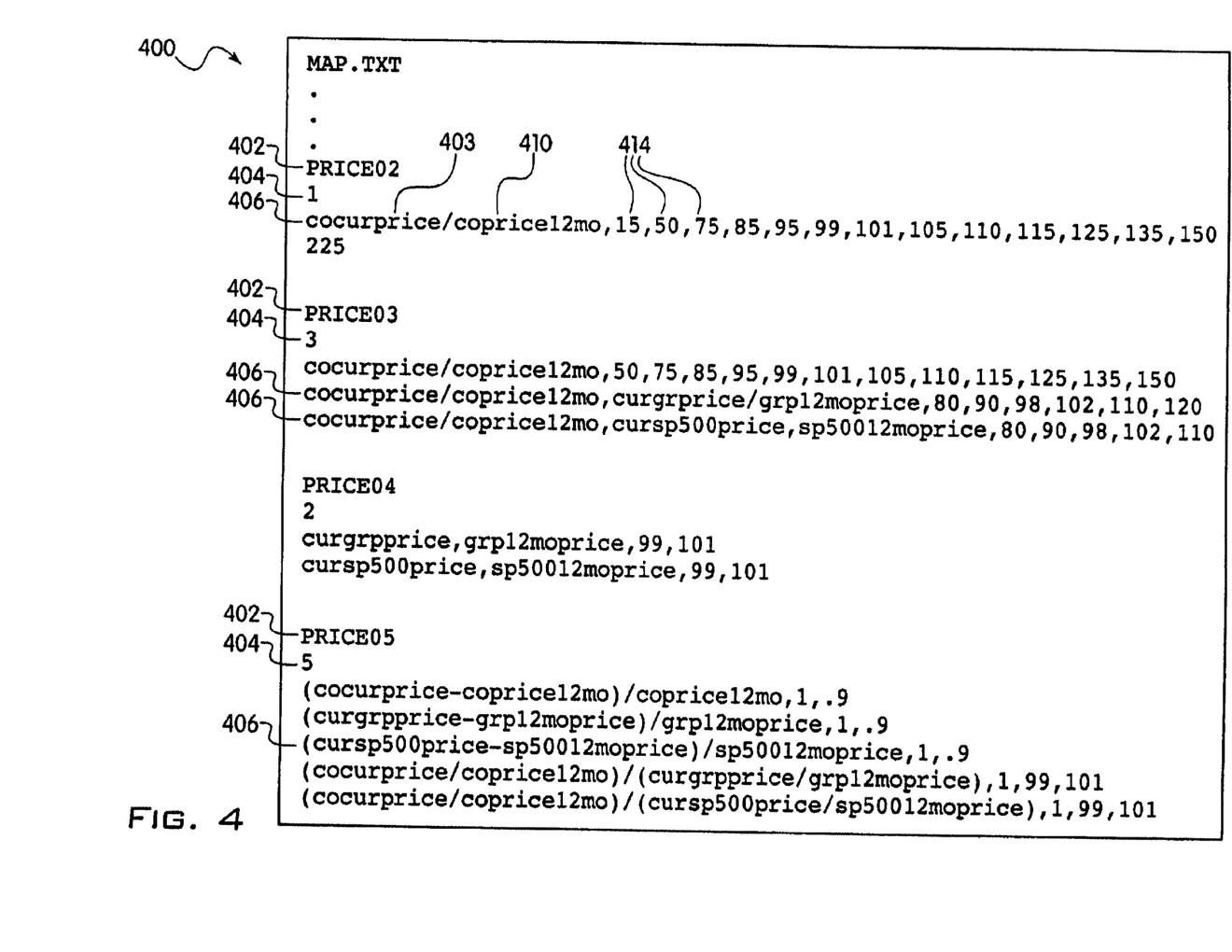
FIG. 4 shows a portion of an exemplary map file for use by the exemplary text generation system of FIG. 1, according to the present invention.

FIG. 4 shows a portion of the contents of an exemplary financial decisional statement file 400—also referred to colloquially as a "map" file. The statement file 400 is sometimes called a "map" file because it provides the "roadmap" of how to generate a desired report. The contents of exemplary statement file 400 may be stored in the memory system 11 (e.g., on a magnetic disk) to allow access by the text generator 10.

Entries in exemplary decision statement file 400 may be delimited by, for example, null characters, or any other well known format that allows the text generator 10 to retrieve individual entries.

Exemplary decisional statement file 400 is grouped by labels 402 (e.g., "PRICE02", "PRICE03", "PRICE04") used to identify the different pieces of text that may be needed in order to generated the desired report. Beneath each label 402 is a statement count 404 that indicates the number of decisional statements 406 grouped underneath each label 402. For example, three decisional statements 406 are grouped under label PRICE03, as indicated by the numeral "3" in FIG. 4.

Each exemplary decisional statement 406 includes two operands 408, 410, followed by at least one result group delimiter 414 used to indicate the start and end of each result grouping. The operands 408, 410 are used during text generation to evaluate a base equation used by the text generator 10 to determine logical relationships. Although many types of equations may be used as possible base equations, the exemplary embodiment of the financial text generation system 1 uses the following equation as the base equation:

$$\frac{Operand\_1}{Operand\_2} \times 100$$

This equation is useful in the present example of a financial report generator because it allows for the computation of ratios and percentages that are common in financial analysis.

Note that the number of operands included in each decisional statement 406 is dependent on the type of base equation used. For example, if the base equation were specified as follows $$Operand\_1$$

which requires only one operand, then the decisional statements used with this base equation need only include one operand. In the presently described embodiment, the base equation uses two operands, and therefore each decisional statement 406 includes two operands 408, 410.

The result of the calculation of the base equation using the operands 408, 410 is then compared with the result group delimiters 414 to determine into which result grouping the result fits. For example, given the simple decisional statement 406:

1, 2, 25, 50, 75, 100 the operands 408, 410 are "1" and "2", and the result group delimiters 414 are "25," "50," "75," and "100." These result group delimiters 414 define five result groupings, which may given letter designations for ease of description:

result grouping "A"→x<=25 result grouping "B"→25<X<=50 result grouping "C"→50<x<=75 result grouping "D"→75<x<=100 result grouping "E"→100<x where "x" is the result of the base equation calculated using the operands 408, 410. Thus, the execution of this simple exemplary decisional statement 406 would be as follows:

$$\frac{1}{2} \times 100 = 50 \rightarrow result\ B("50")$$

Operands 408, 410 may be either numerics or variables (e.g., "cocurprice", "coprice12mo", etc.), and may include embedded arithmetic operations (e.g., addition, division, etc.). Where a decisional statement 406 uses a variable name, the value for the variable is retrieved during text generation from the value for that variable in, for example, the financial data file 300 (see FIG. 3).

As mentioned previously, each decisional statement 406, when evaluated, results in the determination of a specific result grouping (sometimes referred to colloquially as a "bucket") based on the results of the base equation calculation. These groupings may be conveniently referred to in terms of letter designations: i.e., the first result grouping is result "A", the second result grouping is result "B", and so forth. In the previous simple example, the decisional statement evaluated to the second result grouping, result "B." The different result groupings are defined by the result group delimiters 414, which indicate the upper and/or lower limits of each result grouping. The use of these distinct quanta (classifications) for result values allows logic paths to be developed to deal with a wide variety of outcomes, as well as for groupings of multiple decisional statements 406, as will be further discussed below.

The use of the decisional statements 406 to generate logic paths may be further described through the following example. A decisional statement is specified to determine the performance of a corporation (as represented by earnings per share) during the current fiscal year as compared to the previous fiscal year:

EPScur12mo, EPSprev12mo, 80, 90, 97,102, 110, 120

The decisional statement above specifies two operands—earnings per share for the current twelve months and earnings per share for the previous twelve months—that will be used to compute a result for the base equation, and which will then be applied to determine the appropriate result grouping. The decisional statement given above also includes seven result groupings (A,B,C,D,E,F,G) defined by six result group delimiters (80, 90, 97, 102, 110, 120) specified in the decisional statement.

Upon evaluation of this decisional statement during text generation, the text generator will compute the following equation:

$$\frac{EPScur12mo}{EPSprev12mo} \times 100 = RESULT$$

The text generator will then select an appropriate result grouping using the result group delimiters:

If RESULT<=80, the decisional statement outcome is "A"
If 80<RESULT<=90, the decisional statement outcome is "B";
If 90<RESULT<=97 the decisional statement outcome is "C";
If 97<RESULT<=102, the decisional statement outcome is "D";
If 102<RESULT<=110, the decisional statement outcome is "E";
If 110<RESULT<=120, the decisional statement outcome is "F";
If 120<RESULT, the decisional statement outcome is "G".

A logic path would then be established based on the result grouping. As will be further described below, the text generated for the logic path based on cases A–G may then be tailored to the particular conclusion to be reached from each result grouping. For example, if the result for the above decisional statement example was "A", that would indicate a very poor current performance relative to the previous fiscal year, and the resulting text may reflect such a bad result. Likewise if the outcome of the above decisional statement was "G", that would indicate an exceptional performance, and the resulting text may be tailored to reflect such a good result.

A beneficial result of the use of distinct result groupings is that the text generator may easily process non-linear result groupings, results approaching or equal to zero, or results that involve negative values. For example, in the above decisional statement example, the result group delimiters of the decisional statement reflect a non-linear distribution of result groupings, which allows the text generator to select text that better matches the desired interpretation of the data.

As another example of the use of decisional statements, the following group of statements compares the earnings of a fictitious company DEF Co. for the present quarter (curqEPS) to the earnings for the previous quarter (prevqEPS):

curqEPS,1,0 prevqEPS,1,0

(curqEPS+0.0001), (prevqEPS+0.0001),0.01,0.1,0.16,0.25,0.5,1,2, 4,6,10,100

(curqEPS+0.0001)−(prevqEPS+0.0001),1,−40,−20,−10,−5,0,5,10, 20,40

The first decisional statement determines whether current quarter EPS for DEF Co. is negative, zero or positive by computing the base equation as follows:

$$\frac{curqEPS}{1} \times 100$$

If curqEPS is negative or zero, the result grouping will be "A", while if curqEPS is positive, the result grouping will be "B." The next decisional statement determines whether the previous quarter EPS for DEF Co. (prevqEPS) was negative, zero or positive in a similar manner. The logic path generated for this group of decisional statements will therefore reflect the sign of the earnings values.

The third decisional statement computes a comparison between the current quarter EPS figure and the previous quarter EPS figure:

$$\frac{curqEPS + 0.0001}{prevqEPS + 0.0001} \times 100$$

In order to account for division-by-zero problems, a miniscule amount (relative to the values being measured) is added to each variable for which a zero value is possible. The presence of zero earnings in either quarter in this example would be indicated by the base equation producing an abnormally large result or an abnormally small result:

if curqEPS=0, then base equation<0.01
if prevqEPS=0, then base equation>100

The result groupings of the third decisional statement reflect these possibilities: a result "A" will be returned for a base equation<=0.01, and a result "M" will be returned for a base equation>100. Note that if the current and previous quarter earnings are both positive non-zero numbers, the third decisional statement will yield a result that indicates the percentage earnings increase/decrease from the previous quarter to the current quarter. Note also that if one (but not both) of the earnings values is negative, the third decisional equation will produce a result "A," as the computation of the base equation will yield a negative number.

The fourth decisional statement determines a subtraction measurement where a percentage measurement is inappropriate (e.g., earnings transition from negative to positive):

$$\frac{(curqEPS + 0.0001) - (prevqEPS + 0.0001))}{1} \times 100$$

The result groupings for this fourth decisional statement reflect a transition from positive to negative earnings (base equation<0) and a transition from negative to positive earnings (base equation>0).

After these four decisional statements have been evaluated, the logic path created from the result groupings from each decisional statement will indicate the type of text analysis required. For example, if DEF Co. had previous quarter earnings of $-0.20 per share and current quarter earnings of $+0.12 per share, the four decisional statements would evaluate as follows:

$$\text{curqEPS},1,0 \rightarrow \text{result "B"} \quad (1)$$

$$\text{prevqEPS},1,0 \rightarrow \text{result "A"} \quad (2)$$

$$(\text{curqEPS}+0.0001), (\text{prevqEPS}+0.0001), 0.01, 0.1, 0.16, 0.25, 0.5, 1, 2, 4, 6, 10, 100 \rightarrow \text{result "A"} \quad (3)$$

$$(\text{curqEPS}+0.0001)-(\text{prevqEPS}+0.0001), 1, -40, -20, -10, -5, 0, 5, 10, 20, 40 \rightarrow \text{result "I"} \quad (4)$$

A logic path of BAAI would be generated, and text would be selected based on this logic path to reflect that the earnings of DEF Co. had transitioned from negative to positive, and had done so by between 20 and 40 cents per share.

Figure 5:
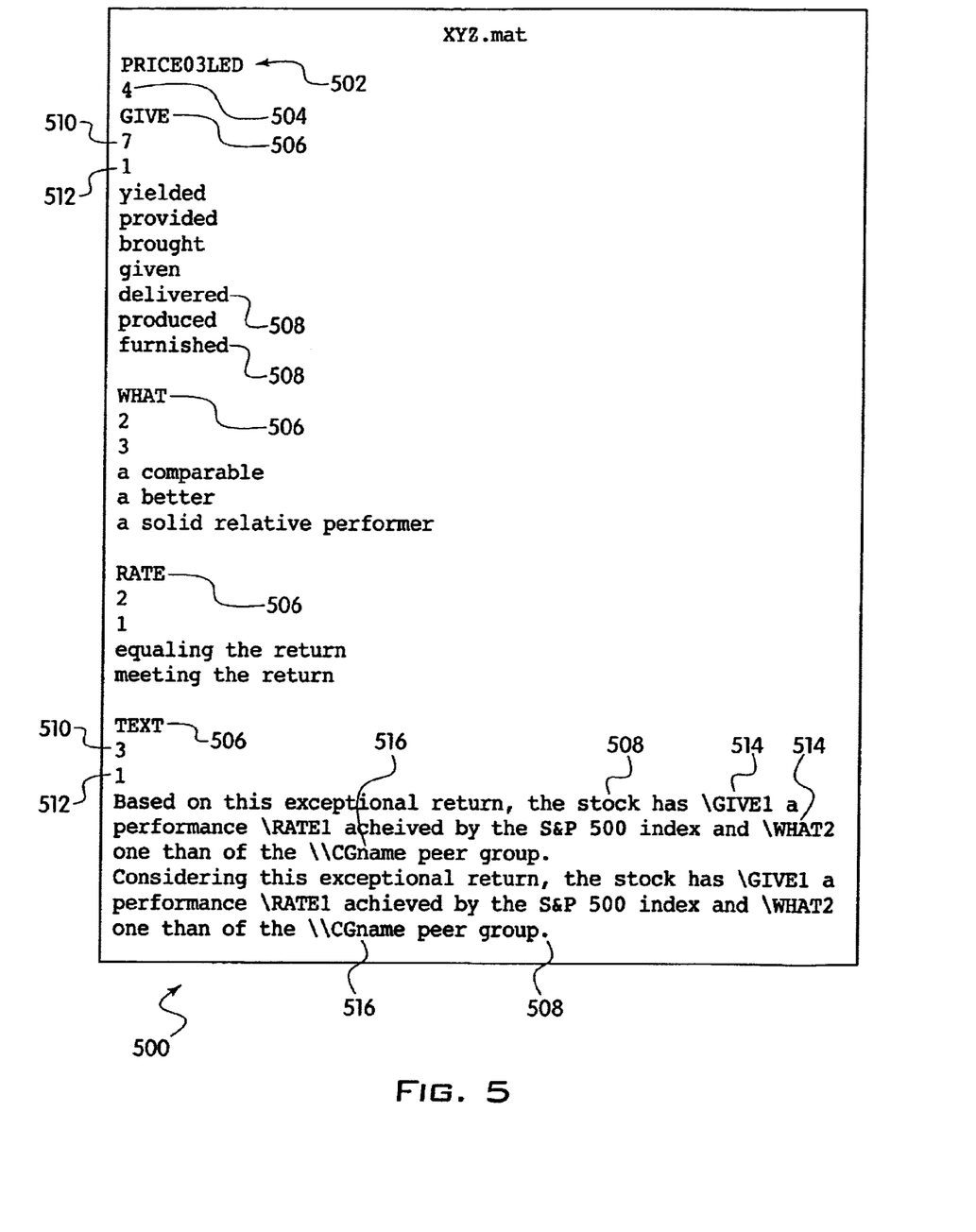
FIG. 5 shows a portion of an exemplary text data file for use by the exemplary text generation system of FIG. 1, according to the present invention.

The flexibility of the decisional statement format allows decisional statements to be created to handle a wide range of analytical situations, similar to the previous example. FIG. 5 illustrates a portion of an exemplary text source file 500. Text source file 500 is used to store the possible text words, phrases, sentence fragments and sentence and paragraph templates to be used to generate the text for a desired report. Exemplary text source file 500 (which may also be referred to colloquially as a "mat" file) as depicted in FIG. 5 is a text source file for a report on the fictitious XYZ Corporation as described earlier (filename "XYZ.mat"). The contents of exemplary text source file 500 may be stored in the memory system 11 (e.g., on a magnetic disk) to allow access by the text generator 10. Entries in the exemplary text source file 500 may be delimited by, for example, null characters, or any other well known format that allows the text generator 10 to retrieve individual entries.

Exemplary text source file 500 is arranged hierarchically into collections of text according to the labels used in the associated map file 400 (see FIG. 4) and the logic paths generated by the decisional statements grouped under those labels. For example, in FIG. 5, a text file identifier 502—"PRICE03LED"—indicates that the file entries following this identifier correspond to the label "PRICE03" used in decisional statement file 400 and the logic path "LED" (described further below). Other labeling systems are possible, although the aforementioned format has the benefit being easily understandable for debugging purposes.

The format of exemplary text source file 500 will now be explained. Following each text file identifier 502 is an index value 504 that indicates the number of sub-entries that are associated with the particular text file identifier 502. For example, as shown in FIG. 5, four sub-entries are associated with the text file identifier 502 "PRICE03LED", as reflected by the numeric "4" on the line beneath the "PRICE03LED" identifier.

Associated with each text file identifier 502 is at least one sub-entry. The sub-entry will be at least one text variable 506, which will further include a number of text fragments 508 that may be assigned to that text variable 506 during text generation. The text fragments 508 associated with a particular text variable 506 may be grouped into multiple "text sets", for example, in order to provide different verb tenses or other grammatical variations. To accomplish this, the text variable 506 will also use text variable indices 510, 512, which denote the number of text sets associated with the text variable 506, and the number of text fragments 508 associated with each text set, respectively. The use of text sets allows for the use of, for example, a combination of grammatically consistent terms, and helps prevent the repeated use of the same word in the same block of text.

Referring now specifically to the example given of producing a report for XYZ Corp., the text file identifier PRICE03LED is associated with four text variables 506—"GIVE", "WHAT", "RATE", and "TEXT". The text variable GIVE has seven text sets (indicated by grouping index 510), each of which includes one text fragment 508 (indicated by text fragment index 512). The text variable WHAT has two text sets, with three text fragments 508 in each set.

The text variable TEXT illustrates a nesting feature of the exemplary text generation system according to the present invention. The text variable TEXT is a special case, in that text composition for any text file identifier 502 begins with the evaluation of the TEXT variable for that text file identifier. The text fragments listed under the TEXT variable thus may serve as a templates for generating text related to the text file identifier 502, and every text file identifier 502 will include one sub-entry that is a TEXT-type variable.

In the example shown in FIG. 5, the text variable TEXT includes three text sets of one text fragment 508 per set. However, within each text fragment 508 is a text variable reference 514 to another text variable 506 associated with the text file identifier 502 "PRICE03LED". For example, the first text set of the TEXT variable of FIG. 5 includes the following text:

Based on this exceptional return, the stock has \GIVE1 a performance . . . .

The single "\" operator may be used to indicate that the following word is a text variable reference 514. The presence of the text variable reference 514 indicates to the text generator that the variable referenced should be evaluated to determine its contents, and an appropriate text fragment 508 should be inserted into the text fragment 508 at the location of the text variable reference 514. The numeric index designation appended to the end of the text variable reference 514 indicates the particular text fragment 508 within the selected text set that should be used at the location specified by the text variable reference 514.

When a text variable is referenced, the text generator processes the text variable by selecting a text set from the group of text sets associated with the text variable. For example, when the "\GIVE1" reference 514 is encountered, the text generator would process the GIVE text variable by selecting one of the seven text sets associated with the GIVE variable. The text generator may use any known method for selecting a text set—for example, a random selection process using a random number generation technique. The number index appended to the end of the text variable reference 514—in this example, the "1" in "\GIVE1"—instructs the text generator to use the first text fragment 508 listed in the selected text set.

Each text fragment 508 may also include a data variable reference 516. The data variable reference 516 is indicated, for example, by double "\" operators prior to a variable name that corresponds, for example, to a field in the financial data file 300. Referring specifically to FIG. 5, the "\\CGname" data variable reference 516 in the text fragments 508 for the TEXT variable (" . . . than of the \\CGname peer group.") is a reference to the company's industry group within the industry sector (which, in the case of the XYZ Corporation example, is the "Globally Established Software Companies"—see FIG. 3). During text generation, the summary generator substitutes the item in data file 300 corre sponding to the CGname variable into the location in text fragment 508 where "\\CGname" is placed:

... than of the Globally Established Software Companies peer group.

Text generator 10 may be used to synthesize the text of the desired report based on the financial data file 300, the decisional statement file 400 and the text data file 500. Text generator 10 may include, for example, one or more C language programs that can access the memory system 11 that provides the financial data, decisional statements and text data, and process the decisional statements and text fragments, according to methods well known to those in the art. Such processing may be done via batch processing, real-time processing, or another well known scheme.

The operation of the exemplary embodiment of the present invention will now be further explained with reference to a hypothetical report generation session for the XYZ Corporation discussed above. As such, the financial data for XYZ Corp. are provided by financial data file 300 which includes those data items illustrated in FIG. 3, and the financial decisional statements for the report to be generated on XYZ Corp. are provided by the map file 400, which includes the decisional statements illustrated by FIG. 4. The text data for the report to be generated on XYZ Corp. are provided by text source file 500, which includes the entries illustrated by FIG. 5.

Figure 6:
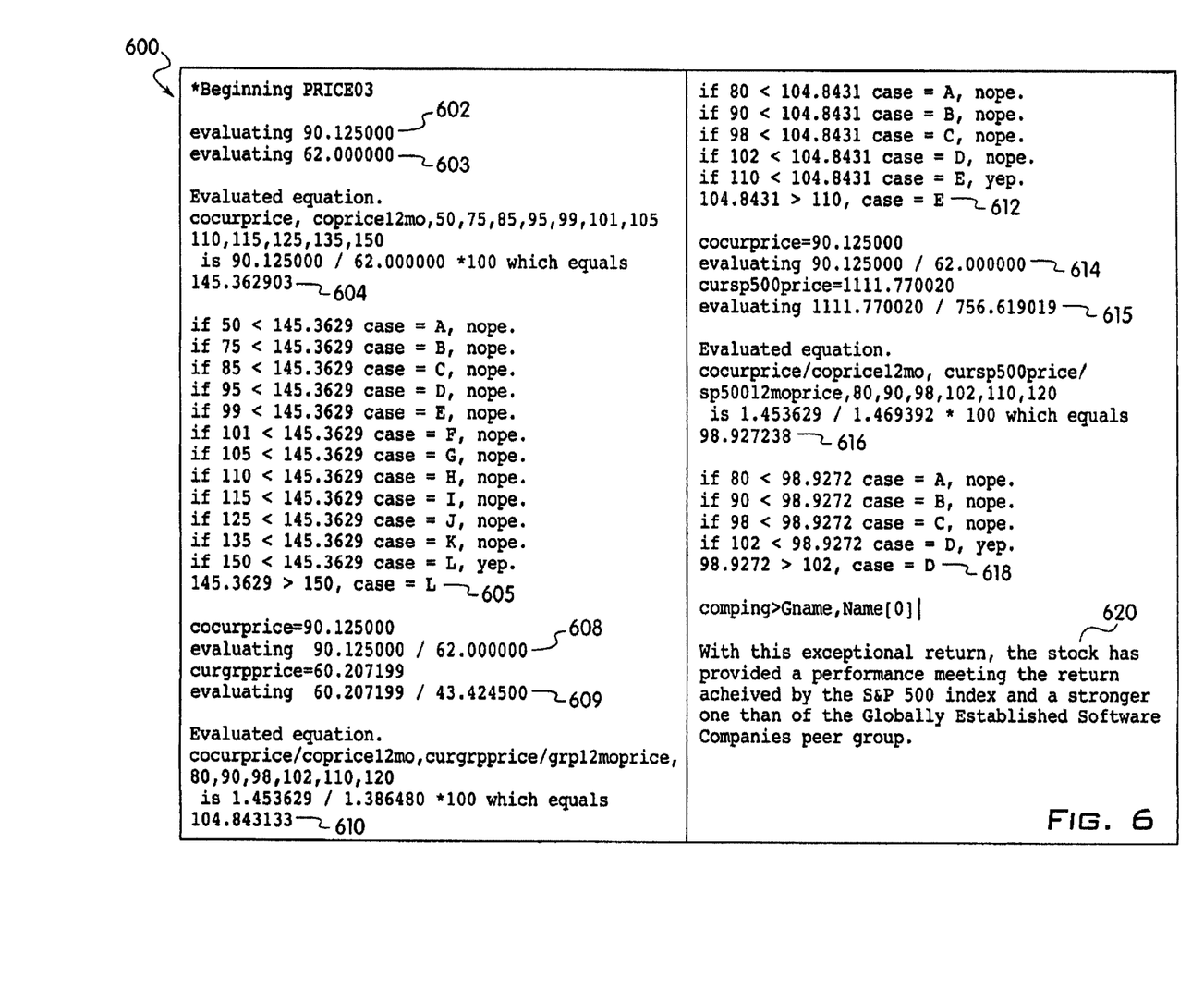
FIG. 6 shows a portion of an exemplary output listing file provided by the exemplary text generation system of FIG. 1, according to the present invention.
Figure 7A:
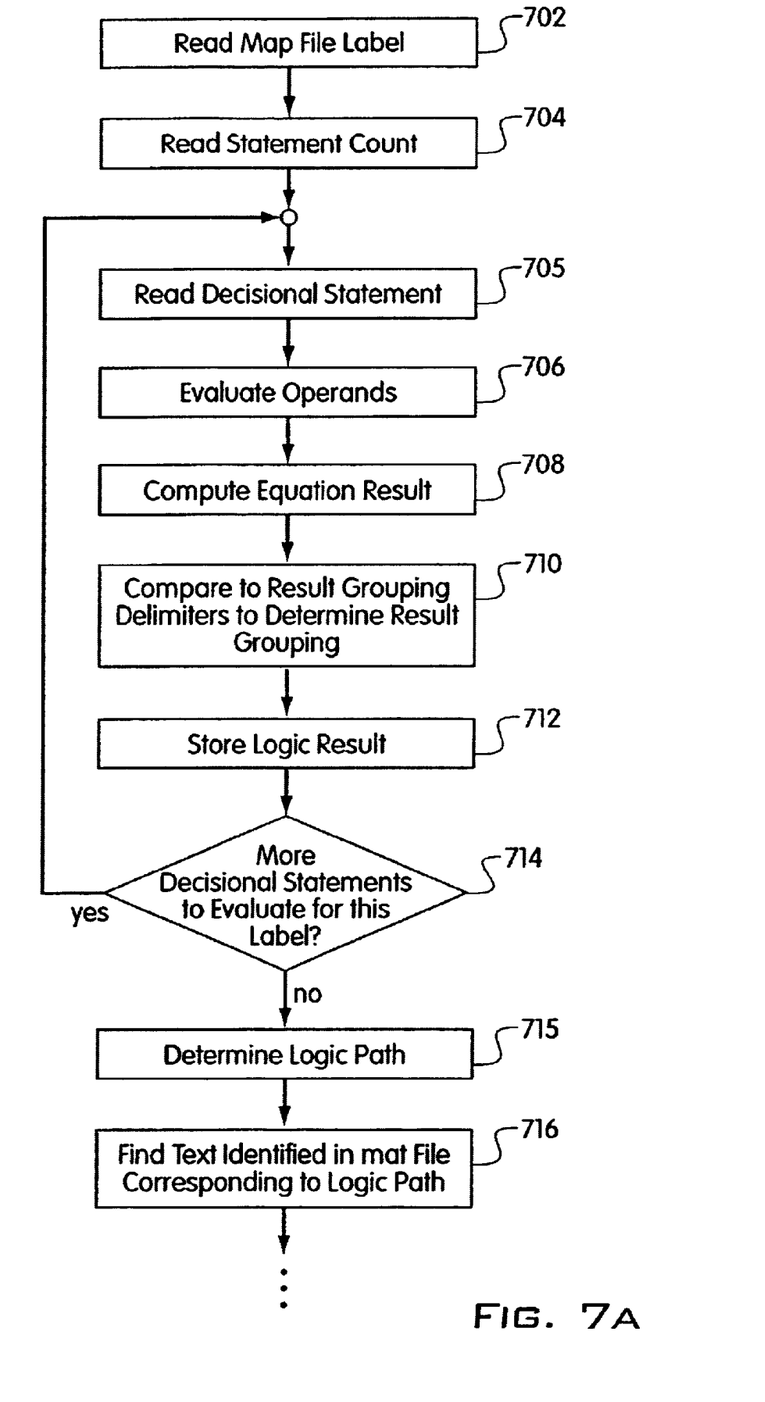
FIG. 7 shows a second flow chart of the operation of the exemplary text generation system of FIG. 1, according to the present invention.
Figure 7B:
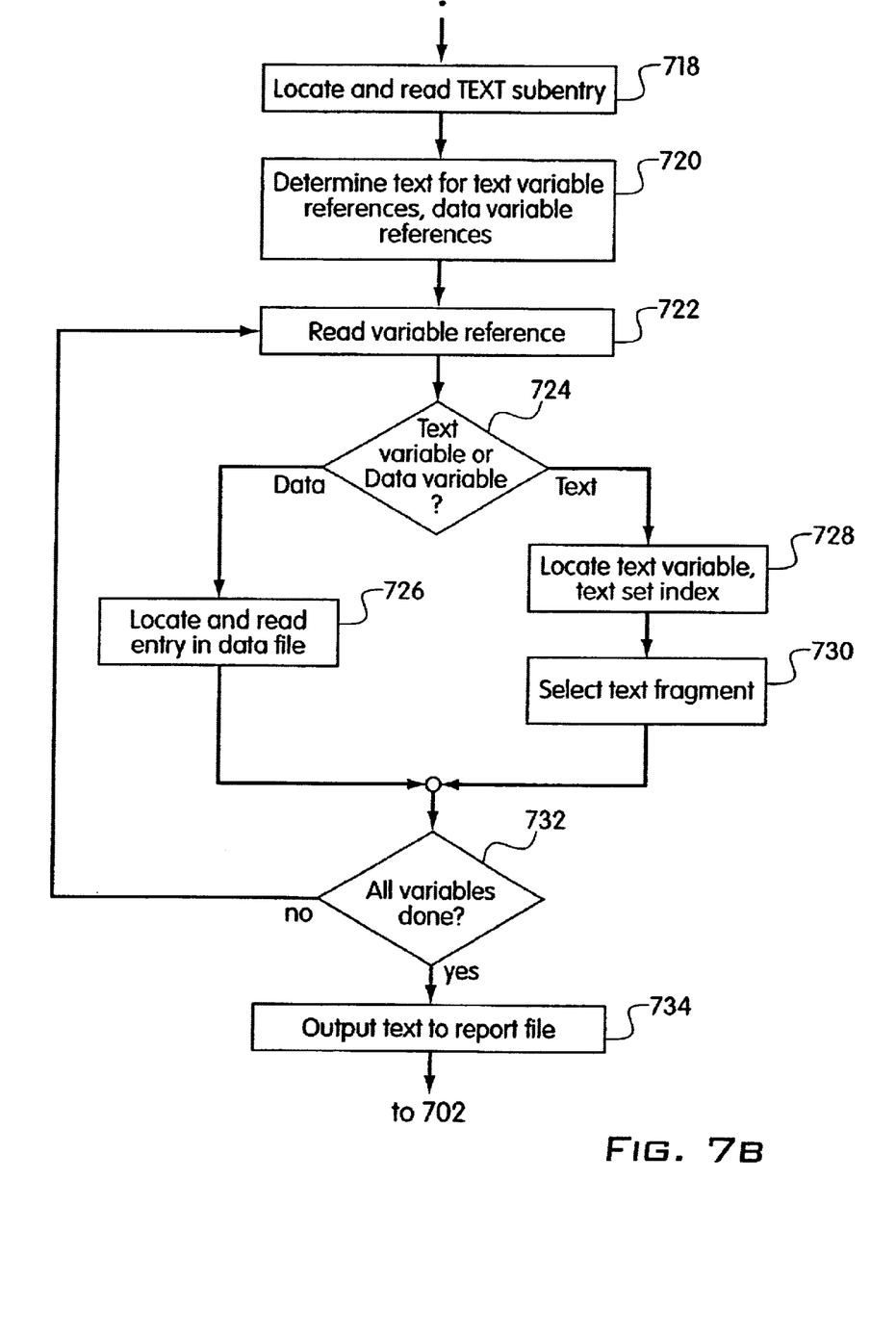

FIG. 6 depicts a portion of an output listing file 600 that tracks the operation of text generator 10 on the financial data file 300, map file 400 and text source file 500 for XYZ Corporation. FIG. 6 is limited for purposes of clarity to only that portion of output file 600 that reflects the evaluation of the decisional statements associated with the PRICE03 label of map file 400. Text generator 10 may produce output listing file 600, for example, for debugging purposes. FIG. 7 illustrates a detailed flow chart describing the operations of text generator 10 in preparing the desired report. In the course of processing map file 400, the text generator 10 initially reads the label PRICE03 from map file 400 (step 702), which identifies a group of decisional statements to evaluate. The text generator 10 then reads the statement count 404 (step 704), which indicates that three decisional statements need to be evaluated in order to resolve the logic path for the PRICE03 label. The text generator 10 then reads the first decisional statement 406 associated with the PRICE03 label from the map file 400 (step 705):

cocurprice,coprice12mo,50,75,85,95,99,101,105,110, 115,125,135,150

The text generator locates the operands within the first decisional statement 406—"cocurprice" (the company current stock price) and "coprice12mo" (the company stock price 12 months earlier)—and determines values for these operands by retrieving the appropriate values from the financial data file 300 (step 706). This step is indicated by items 602 and 603 of the output listing file 600, which show that the value for cocurprice is determined to be "90.125000" and the value for coprice12mo is determined to be "62.000000."

The operands of the first decisional statement are then applied to the base equation, and a result of this calculation is produced (step 708). The evaluation of the base equation using the operands yields "145.362903", as reflected by item 604 of output file 600. Note that this computation effectively computes the one year return on the securities of XYZ Corp. (ignoring dividends). The computation result is then compared to the result grouping delimiters 414 of the first decisional statement to determine the "bucket" or result grouping in which the result belongs (step 710). As shown by item 606 of output file 600, the "145.362903" result is compared to each result grouping, beginning with group "A," until the text generator 10 determines that the correct classification is group "L." At this point, the result grouping is stored for later use in determining the logic path (step 712).

Since the PRICE03 label is associated with more than one decisional statement (step 714), the second decisional statement associated with the PRICE03 label is read by the text generator 10 (step 705):

cocurprice/coprice12mo,curgrpprice/grp12moprice,80, 90,98,102,110,120

In the case of this second decisional statement, the first operand is actually the result of a division of the variables "cocurprice" and "coprice12mo." Thus, in step 706, the text generator 10 retrieves the values for these variables from the data file 300, and calculates the results of the "embedded" division operation. The evaluation of the first operand is reflected by item 608 of the output file 600. Similar processing is performed to evaluate the second operand of the second decisional statement, as this operand also specifies a division of two variables ("curgrpprice" and "grp12moprice"). The evaluation of the second operand is reflected by item 609 of the output file 600.

The operands of the second decisional statement are then used to compute the result of the base equation (step 708) to yield "104.843133", as reflected by item 610 of output file 600. This computation effectively computes the one year return on the securities of XYZ Corp. relative to the one year return of the industry group index. The computation result is then compared to the result grouping delimiters 414 of the second decisional statement to determine the appropriate result grouping (step 710). As shown by item 612 of output file 600, the "104.843133" result is compared to each result grouping, beginning with group "A," until the text generator 10 determines that the correct classification is group "E." At this point, the result grouping is stored for later use in determining the logic path (step 712).

The third decisional statement associated with the PRICE03 label then is read by the text generator 10 (step 705):

cocurprice/coprice12mo,cursp500price/sp50012moprice, 80,90,98,102,110,120

As was the case for the second decisional statement, the operands of the third decisional statement also call for the division of variables to resolve the desired operands. Thus, in step 706, the text generator 10 retrieves the values for these variables from the data file 300, and calculates the results of the desired divisions. The evaluation of the first operand is reflected by item 614 of the output file 600, and the evaluation of the second operand is reflected by item 615 of the output file 600.

The operands of third decisional statement are then applied to the base equation, with a result of "98.927338" (step 708), as reflected by item 616 of output file 600. This computation effectively computes the one year return on the securities of XYZ Corp. relative to the one year return of the S&P 500 index. The computation result is then compared to the result grouping delimiters 414 of the third decisional statement to determine the appropriate result grouping (step 710). As shown by item 618 of output file 600, the "98.927238" result is classified as a group "D" result. This result grouping is stored for later use in determining the logic path (step 712).

Once the three decisional statements associated with the PRICE03 label have been evaluated, the logic path outcome of the equations is determined to be "L"+"E"+"D", based on the combination of the result groupings produced by the three decisional statements (step 715). The text generator 10 parses the text source file 500 for the text file identifier 502 that corresponds to the PRICE03 label and the "LED" logic path—in the present example, the identifier "PRICE03LED." (step 716). Note that there may be numerous text file identifiers 502 in text source file 500 related to the PRICE03 label that correspond to alternate logic paths (e.g., "PRICE03AAA," "PRICE03BBB," and so forth).

Once found, the text generator 10 reads the index value 504 for the PRICE03LED text file identifier 502, and locates the TEXT text variable sub-entry (step 718). The text sets associated with the TEXT text variable are identified and selected, for example, by a random selection process. In the case of the present example, the second text set is selected containing the following text fragment 508:

With this exceptional return, the stock has \GIVE1 a performance \RATE1 achieved by the S&P 500 index and \WHAT2 one than of the \\CGname peer group.

In step 720, the text variable references 514 and data variable references 516 are resolved for the selected TEXT text fragment 508. The text generator 10 parses the selected text fragment 508 to find each variable reference (step 722). If the variable reference is determined to be a data variable reference 516 (step 724), the appropriate financial data value is read from the financial data file 300 (step 726). For example, once the text generator 10 finds the data variable reference "\\CGname", the corresponding data file value ("Globally Established Software Companies") is read from the data file 300, reflected by item 619 in the output file 600. If the variable reference is determined to be a text variable reference 514, the text variable is located in the text source file 500 (step 728) and a text fragment 508 is selected from the text fragments associated with the text variable (step 730). For example, when the text generator 10 finds the text variable reference "\GIVE1", the "GIVE" text variable is located in the text source file 500, and the number of text sets is identified as seven, based on the text set index 510 (step 728). A text fragment is then selected by, for example, randomly selecting one of the seven text sets, and selecting the first text fragment 508 listed in the selected text set, because the "1" in "\GIVE1" specifies the first text fragment of the set (step 730).

Once all of the variable references 514, 516 have been resolved (step 732), the text associated with the PRICE03LED logic outcome is composed and stored for use in the report (step 734), as reflected by item 620 of the output file 600:

With this exceptional return, the stock has PROVIDED a performance MEETING THE RETURN achieved by the S&P 500 index and A STRONGER one than of the GLOBALLY ESTABLISHED SOFTWARE COMPANIES peer group.

where the capitalized text is the text determined by processing the variable references at run time.

As mentioned previously, according to the exemplary systems and methods described above, an embodiment of the present invention may be implemented and employed to quickly generate textual reports for financial (or other) data in a flexible manner that accounts for real-world analytical situations and produces human-quality text. Reports may be generated in real-time and delivered in real-time, depending upon the speed and capacity of the text generation system and the desired delivery method. Large numbers of reports can be generated in a short period of time and, for reports which use a common format, multiple reports may be generated from a single set of decisional statements and text data, reducing overhead.

In the preceding specification, the present invention has been described with reference to specific exemplary embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

What is claimed is:

1. A method of text generation, comprising the steps of:
   evaluating a base equation using a first operand and a second operand of a decisional statement to obtain an equation result;
   selecting one result grouping out of a number of result groupings of the decisional statement, based on the equation result;
   determining a logic path based on the one result grouping;
   selecting a first text fragment from a text data file located in a memory system based on the logic path; and
   generating an output including the first text fragment.

2. The method of claim 1, further comprising the steps of:
   reading the decisional statement from a decisional statement file stored in the memory system; and
   determining a value for at least one of the first operand and the second operand by accessing a data file located in the memory system.

3. The method of claim 1, wherein the selection of the first text fragment includes the steps of:
   selecting a text collection from the text file based on the logic path, the text collection including the first text fragment; and
   selecting the first text fragment from the text collection.

4. The method of claim 3, wherein the first text fragment includes at least one text variable reference to a text variable, and further comprising the step of resolving the at least one text variable reference.

5. The method of claim 4, wherein the step of resolving the text variable reference includes the steps of:
   finding a number of text sets associated with the text variable in the text file;
   randomly selecting a text set from the number of text sets associated with the text variable, the selected text set including a number of text fragments;
   selecting a second text fragment from the number of text fragments; and
   replacing the text variable reference with the second text fragment.

6. The method of claims 3, wherein the at least one text fragment includes at least one data variable reference to a data variable, and further comprising the steps of:
   accessing a data file located in the memory system;
   retrieving a data file entry corresponding to the data variable; and
   replacing the at least one data variable reference with the data file entry.

7. A storage medium, comprising:
   a set of instructions that, when accessed by a processor, instruct the processor to perform the steps of:
   evaluating a base equation using a first operand and a second operand of a decisional statement to obtain an equation result;
   selecting one result grouping out of a number of result groupings of the decisional statement, based on the equation result;

determining a logic path based on the one result grouping;

selecting a text fragment from a text data file located in a memory system based on the logic path; and generating an output comprising the text fragment.

8. A text generation system, comprising:

means for evaluating a base equation using a first operand and a second operand of a decisional statement to obtain an equation result;

means for selecting one result grouping out of a number of result groupings of the decisional statement, based on the equation result;

means for determining a logic path based on the one result grouping;

means for selecting a text fragment from a text data file stored in a memory system based on the logic path; and means for generating an output including the text fragment.

9. A system for generating textual financial reports, comprising:

a memory system containing financial data, decisional statements and text data;

a processor coupled to said memory system which evaluates at least one of said decisional statements using the financial data and generates a report; and a random number generator coupled to said processor, wherein said report is generated by selecting text fragments from said text data based on a random number generated by the random number generator and the evaluation of the at least one of said decisional statements.

10. The system of claim 9 wherein at least one of said selected text fragments contains a variable reference which is resolved by replacing the variable reference with a different one of said selected text fragments based on the random number.

11. The system of claim 9 wherein at least one of said selected text fragments contains a variable reference which is resolved by replacing the variable reference with a data file entry.

12. The system of claim 9 wherein each of the decisional statements includes a first operand, a second operand, and a plurality of result groupings.

13. The system of claim 12 wherein the processor evaluates the decisional statement by calculating the result of a base equation using the first and second operands, selecting a result grouping of said plurality of result groupings based on the calculated result, and determining a logic path based on the selected result grouping.

14. The system of claim 13 wherein at least one of said selected text fragments contains a variable reference which is resolved by replacing the variable reference with a different one of said selected text fragments based on the random number.

15. The system of claim 13 wherein at least one of said selected text fragments contains a variable reference which is resolved by replacing the variable reference with a data file entry.

16. A method for generating textual financial reports comprising:

evaluating a decisional statement using financial data to obtain a result;

selecting one result grouping out of a number of resulting groupings associated with the decisional statement, based on the decisional statement result;

generating a random number; and determining a text fragment for inclusion in the report based on the selected result grouping and the random number.

17. The method of claim 16 wherein said selected text fragment contains a variable reference which is resolved by replacing the variable reference with a different text fragment based on the random number.

18. The method of claim 16 wherein said selected text fragment contains a variable reference which is resolved by replacing the variable reference with a data file entry.

19. The method of claim 16 wherein the decisional statement includes a first operand, a second operand, and a plurality of result groupings.

20. The method of claim 16 further comprising:

determining a logic path based on the selected result grouping.

21. The method of claim 20 wherein said selected text fragment contains a variable reference which is resolved by replacing the variable reference with a different text fragment based on the random number.

22. The method of claim 20 wherein said selected text fragment contains a variable reference which is resolved by replacing the variable reference with a data file entry.

23. A system for generating textual financial reports, comprising:

a memory system containing financial data, decisional statements and text data; and a processor coupled to said memory system which evaluates at least one of said decisional statements using the financial data and generates a report using an index designation, wherein said report is generated by selecting text fragments from said text data based on the index designation and the evaluation of the at least one of said decisional statements.

24. The system of claim 23 wherein at least one of said selected text fragments contains a variable reference which is resolved by replacing the variable reference with a different one of said selected text fragments based on the index designation.

25. The system of claim 23 wherein at least one of said selected text fragments contains a variable reference which is resolved by replacing the variable reference with a data file entry.

26. The system of claim 23 wherein each of the decisional statements includes a first operand, a second operand, and a plurality of result groupings.

27. The system of claim 23 wherein the processor evaluates the decisional statement by calculating the result of a base equation using the first and second operands, selecting a result grouping of said plurality of result groupings based on the calculated result, and determining a logic path based on the selected result grouping.

28. The system of claim 27 wherein at least one of said selected text fragments contains a variable reference which is resolved by replacing the variable reference with a different one of said selected text fragments based on the index designation.

29. The system of claim 27 wherein at least one of said selected text fragments contains a variable reference which is resolved by replacing the variable reference with a data file entry.

30. A method for generating textual financial reports comprising:

evaluating a decisional statement using financial data to obtain a result;

selecting one result grouping out of a number of resulting groupings associated with the decisional statement, based on the decisional statement result;

determining an index designation; and determining a text fragment for inclusion in the report based on the selected result grouping and the index designation.

31. The method of claim 30 wherein said selected text fragment contains a variable reference which is resolved by replacing the variable reference with a different text fragment based on the index designation.

32. The method of claim 30 wherein said selected text fragment contains a variable reference which is resolved by replacing the variable reference with a data file entry.

33. The method of claim 30 wherein the decisional statement includes a first operand, a second operand, and a plurality of result groupings.

34. The method of claim 30 further comprising:

determining a logic path based on the selected result grouping.

35. The method of claim 34 wherein said selected text fragment contains a variable reference which is resolved by replacing the variable reference with a different text fragment based on the index designation.

36. The method of claim 34 wherein said selected text fragment contains a variable reference which is resolved by replacing the variable reference with a data file entry.

* * * * *